June 5, 1934.  H. N. BLISS  1,961,191
ARTICLE HANDLING DEVICE
Filed March 16, 1932    3 Sheets-Sheet 1

INVENTOR
Harold N. Bliss
BY
Synnestvedt & Lechner
ATTORNEYS

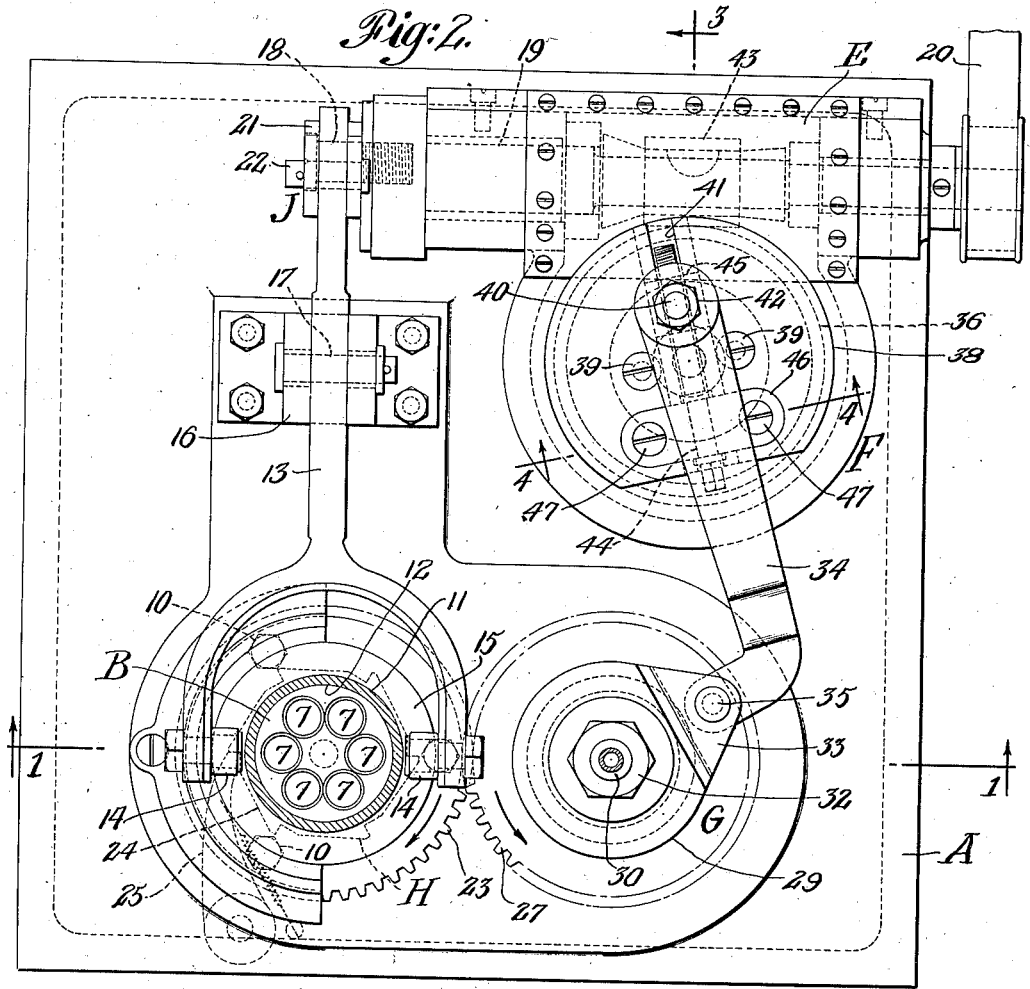
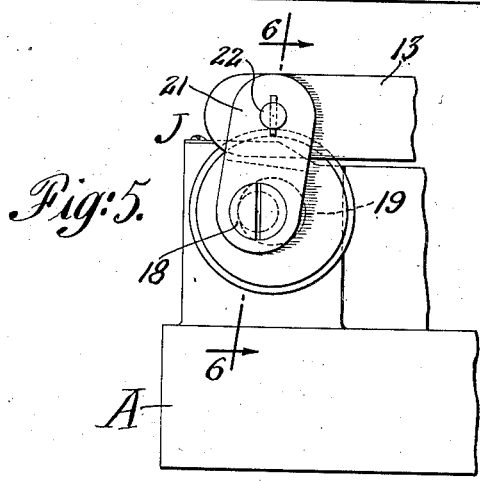
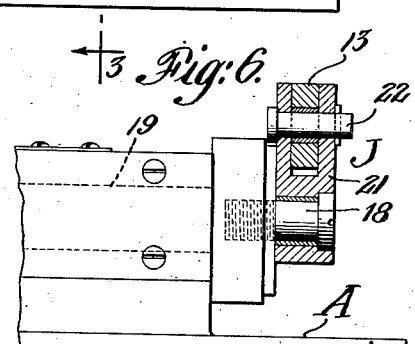

Patented June 5, 1934

1,961,191

UNITED STATES PATENT OFFICE 1,961,191

ARTICLE HANDLING DEVICE

Harold N. Bliss, Ithaca, N. Y., assignor to Morse Chain Company, Ithaca, N. Y., a corporation of New York Application March 16, 1932, Serial No. 599,087

15 Claims. (Cl. 221—118)

This invention relates to improvements in article handling, feeding and distributing devices, such as are particularly useful for handling, feeding and distributing parts such as rollers, pins, bushings and the like.

Devices of this character are ordinarily employed in association with other machines adapted to perform further operations on the articles being handled, but it has been found that devices heretofore employed have a very limited output and, therefore, it has been impossible in certain classes of work to supply parts at a speed equal to the speed at which the associated machines are adapted to handle them.

One of the primary objects of my invention is the provision of an article handling device which has a very high output.

Stated in another way, it is an object of my invention to provide a device of the character described in which the articles being handled are fed to an associated machine in an orderly manner and at a rate such that articles will be supplied to the machines at least as fast as the machine can perform its operations on the articles.

Another object of my invention resides in the provision of an article handling device in which any desired output may be readily obtained.

A further object resides in the provision of what may be termed a multi-channel barrel in devices of the character described which is adapted to receive articles from a hopper and to distribute them to a feed tube or the like, in an orderly manner and without interruption of feed, even though the articles be removed from the feed tube at a high rate.

A still further object of my invention is the provision of novel indexing means for a multi-channel feed or distributing barrel in devices of the character described.

Still another object resides in the provision of means for preventing damage to the device in the event of articles becoming so positioned as to prevent indexing of the feed barrel.

It is also an object of my invention to provide an agitatable hopper in devices of the character described.

A more specific object resides in the provision of a readily replaceable feed or distributing barrel and readily adjustable indexing or actuating mechanism for the barrel.

Other objects reside in the provision of driving mechanism for imparting step-by-step rotation to the barrel and in the provision of a novel friction drive.

How the foregoing, together with such other objects and advantages as may hereinafter appear, or are incident to my invention, are realized, is illustrated in preferred form in the accompanying drawings, wherein—

Fig. 2 is a plan section taken on the line 2—2 of Fig. 1.

Fig. 5 is a fragmentary elevational view of a detail of the invention, and

Fig. 6 is a cross section taken substantially on the line 6—6 of Fig. 5.

Figure 1:
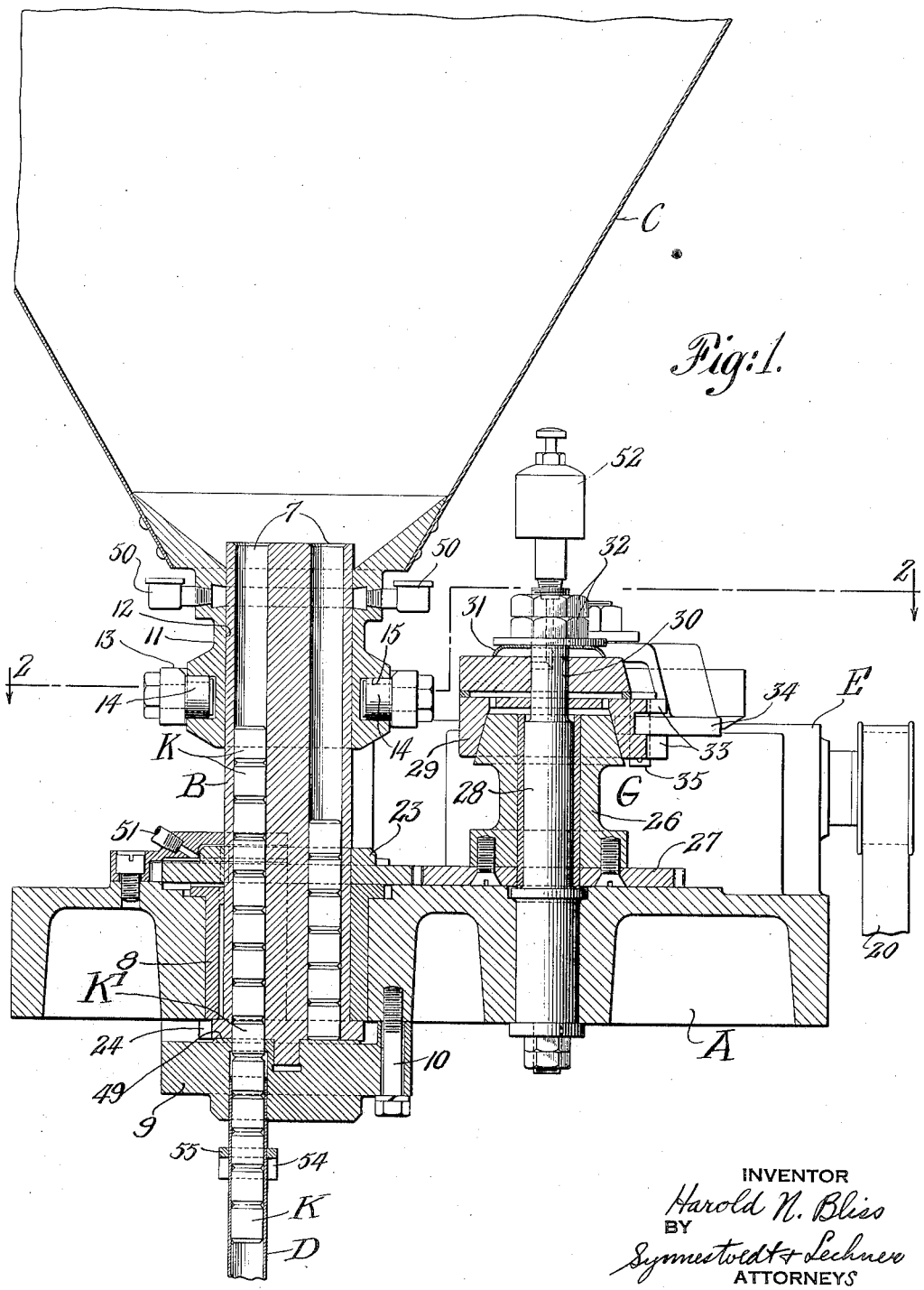
Fig. 1 is a sectional elevational view of a device constructed in accordance with my invention, the section being taken on the line 1—1 of Fig. 2 with certain of the parts appearing in elevation.

The device comprises in general a supporting base A, a rotatable feeding or distributing barrel B; a hopper C adapted to contain the articles to be fed and distributed; a dispatching or delivery tube D for leading the articles away from the device; main driving mechanism indicated as a whole by the reference letter E; mechanism for imparting step by step rotation to the barrel B comprising, in general, an adjustable crank device F, a friction or yieldable device G and a ratchet mechanism H; and mechanism J for effecting agitation of the hopper C.

The device as illustrated in the drawings is for handling rollers K such as employed in roller chains, although it is to be understood that the machine is adapted to handle any articles of a similar nature. In this instance the rollers are fed to a grinding machine for subsequent grinding and it is pointed out in this connection that the grinding machines employed have a very high capacity and, therefore, in order to speed up production it is necessary to quickly and continuously feed rollers thereto so that there will be no idle moments. My device is calculated to fulfill these requirements.

The distributing barrel B is of cylindrical form and may be termed a multi-channel pick-up means, or distributing barrel, and is provided with a plurality of circularly arranged, evenly spaced, longitudinally extending, article receiving bores or channels 7, in this instance six such bores being shown. This barrel is rotatably supported in a bushing 8 secured in the base member A and is vertically supported on a cap member 9 which is detachably secured to the bottom of the base A by means of bolts 10

The hopper C is provided with a bottom member 11 having a bore 12 slidingly fitting the barrel B. This member, therefore, acts as a bearing or support for the hopper C. The hopper is adapted to be agitated by means of a yoked arm 13 which carries rollers 14 fitting an annular groove 15 in the bearing member 11. The arm 13 is pivoted in the bracket 16 carried by the base member A as illustrated at 17 in Figs. 2 and 3, and is adapted to be rocked by means of a crank pin 18 carried by the shaft 19 which receives its drive from any suitable form of driving device such as the belt 20. The crank pin 18 is drivingly connected to the arm 13 by means of a link 21 and pin 22.

The barrel B has a gear 23 keyed thereto at the upper surface of the base A and is provided with a ratchet wheel 24 at its lower end which, in this instance, is formed integrally with the barrel. This ratchet wheel is provided with six teeth corresponding to the six bores of the barrel and a holding pawl 25 (see Fig. 2) is associated therewith for a purpose appearing hereinafter.

Referring now to the friction device G it will be seen that it is in the nature of a cone friction clutch and that it comprises a cone member 26 having a gear 27 secured thereto which meshes with the gear 23 of the barrel B. The member 26 is rotatably mounted on a stud 28 fixedly carried by the base A. A cooperating cone member 29 is centered upon the extension 30 of the stud 29 and is held in frictional relation to the cone member 26 by means of a spring washer 31, the tension of which may be adjusted by means of nuts 32. The friction member 29 is provided with ears 33 adapted to receive a connecting rod 34, the connection between the connecting rod and friction member being made by means of a pin 35.

Figures 3, 4:
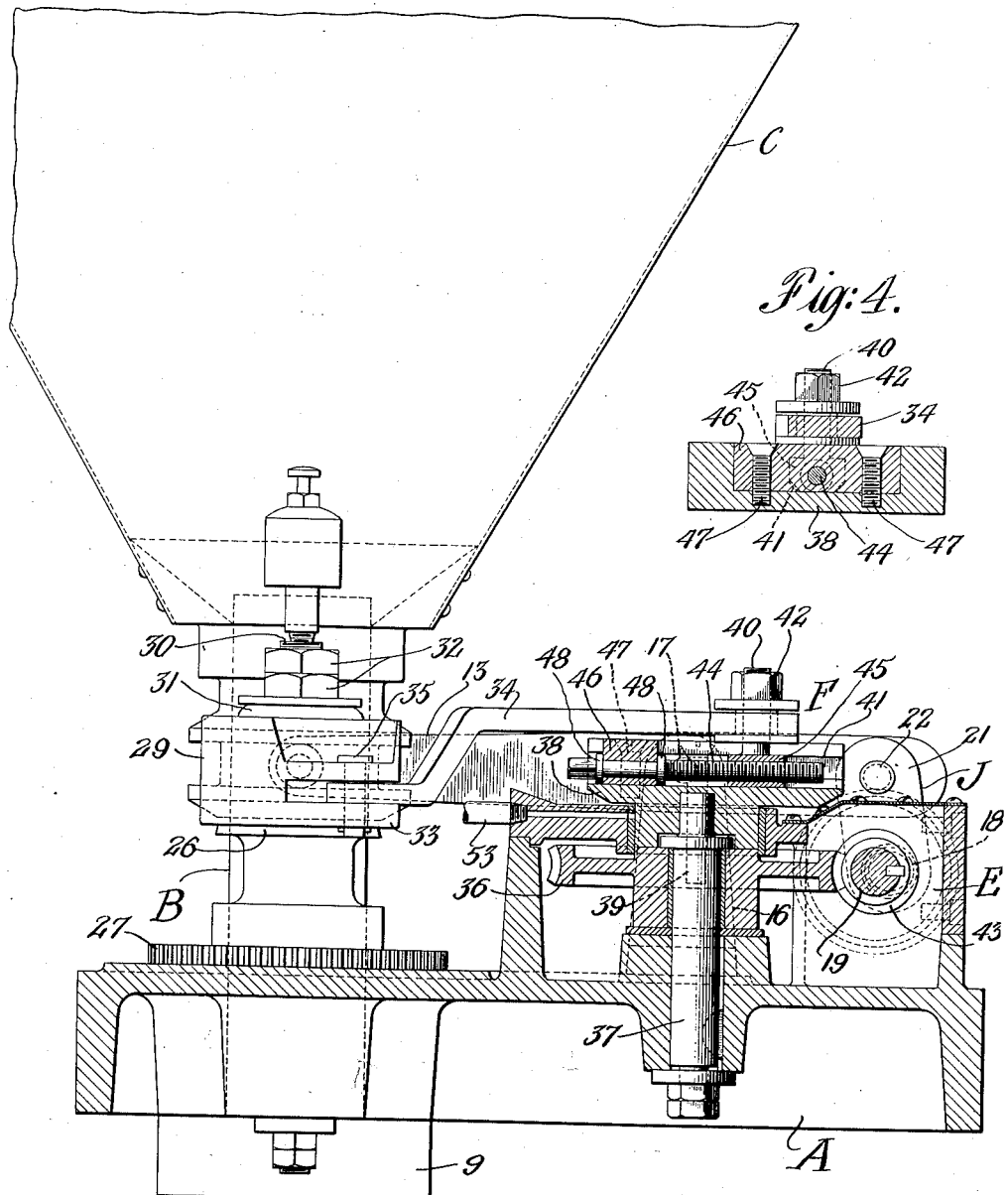
Fig. 3 is a cross section taken substantially on the line 3—3 of Fig. 2.
Fig. 4 is a fragmentary cross section taken on the line 4—4 of Fig. 2.

Referring now particularly to Figs. 2, 3 and 4, the device F comprises a worm wheel 36 rotatably mounted on a stud 37 which is keyed to and supported by the base A; a crank carrying plate or disk 38 secured to the worm wheel 36 by means of screws 39; and an adjustable crank pin 40 movably mounted in a dove-tailed slot 41 in the plate 38. The connecting rod 34 is connected to the crank pin 40 by means of a nut 42.

The worm wheel 36 receives its drive from a worm 43 which is keyed to the shaft 19 of the main driving mechanism E and it will thus be seen that when the crank 40 is rotated oscillatory motion is imparted to the clutch member 29 by means of the connecting rod 34. The crank pin 40 is adapted to be adjusted by means of an adjusting screw 44 which is threaded into the base portion 45 of the crank pin. The adjusting screw is mounted for rotation in a block 46 which is secured to the plate 38 by means of screws 47, and is fixed against longitudinal movement by means of collars 48.

In this instance the crank pin 40 is so adjusted that it will impart a stroke to the friction member 29 of such amplitude that the barrel B will be advanced, one tooth for each upward stroke of the link 34, as viewed in Fig. 2. With each such stroke the friction device G, together with the gears 27 and 23, tends to impart a step rotation to the barrel B of such amplitude that the article receiving bores 7 are successively brought into registry with the delivery tube or receiver D. However, since the device G is a friction device, such step-by-step rotation will only occur under certain operating conditions, as will presently appear.

Referring to the ratchet mechanism H, it will be seen that when the ratchet wheel is advanced by the friction device G the pawl 25 ratchets over the advancing tooth and assumes the position illustrated in Fig. 2 and, therefore, when the connecting rod 34 moves in its downward direction, as viewed in this figure, the barrel B is prevented from rotating in its reverse direction, with the result that the friction device G yields or slips during this direction of movement of the connecting rod and oscillating friction member 29. It will be seen, therefore, that the device G only imparts rotation to the barrel in one direction.

Referring now to Fig. 1, it should be noted that the articles or rollers K have assumed a position such that the roller K' is partly in the bore of the barrel B and partly in the outlet opening of the member 9 and, therefore, it is impossible to impart a rotary motion to the barrel. However, no damage will occur when such a condition exists because then the friction device G yields or slips and the stroke which otherwise would cause rotation of the barrel is an idle one. In most instances this condition will exist whenever there are rollers in the particular channel of the barrel which is in registry or alignment with the delivery tube D and, therefore, feed will continue from said channel until the upper roller in the channel drops to a point below the joint 49 between the bottom of the barrel and the cap member 9. As soon as this happens the barrel will be rotated by the indexing mechanism to bring the next channel into alignment with the discharging tube D and feed will thus continue without interruption. In the event that no rollers are in the advanced channel the barrel will be advanced another step and so on until a channel having rollers therein is in feeding position.

It is pointed out, however, that occasionally the rollers or articles assume such a position in the feeding channel that the plane of the abutting faces of a pair of superimposed rollers lies in the plane of the joint 49 at the instant at which a step movement is to be imparted to the barrel and, therefore, the barrel will rotate bringing the next channel into feeding position. This, however, is not objectionable because the rollers remaining in that particular channel are merely carried around with the rotating barrel and when the barrel is next brought into registry with the delivery tube the rollers feed therefrom.

By employing a plurality of feed channels ample time is provided between feeding positions of any particular channel to ensure its being filled with articles when it is next brought into feeding position, and, therefore, it may be said that as long as the hopper contains articles to be fed an inexhaustible supply of articles is maintained for the delivery tube D. Since the hopper is continuously agitated entrance of the articles into the feed channels is ensured.

In order to properly lubricate the various operating parts of the device suitable lubricating devices are provided, such as cups 50 for supplying lubricant to the hopper bearing at 12, pipe 51 having a cup associated therewith for supplying lubricant to the gear 23 and through suitable passages to the bearing sleeve 8 and ratchet mechanism H, a cup 52 for supplying lubricant to the friction device G, and a pipe 53 having a cup associated therewith for supplying lubricant to the device F.

Referring now to Figures 1 and 3, it will be seen that the delivery tube D is held in place by means of a clamp 54 adapted to engage a collar 55 on the tube. The clamp 54 is carried by a bolt 45 which, when removed, permits the tube to be readily removed from the cap 9. The barrel B is also readily removable from its supporting base A, since it is merely held in position by the cap 9.

This arrangement is advantageous in that the machine may be readily changed over from one type of article to another, it being merely necessary to replace one barrel and delivery tube for others adapted to accommodate the different types of articles to be handled. In some instances it may be desirable to employ more bores or channels in the barrel B and when this is done the number of teeth on the ratchet wheel 24 is made to correspond to the number of bores in the barrel and, in such case, the number of step movements in one revolution of the barrel is made to correspond to the number of teeth on the ratchet wheel. In order to accomplish this the movable crank pin 40 is adjusted to a position in which the amplitude of the oscillations of the friction member 29 corresponds to the pitch of the ratchet teeth. Otherwise the operation is the same as above described.

I claim:

1. In an article handling device adapted to effect substantially continuous feed, the combination of a hopper, a barrel mounted for rotation on a substantially vertical axis and having a plurality of circularly arranged evenly spaced longitudinally extending unobstructed article receiving bores each of which opens into said hopper in all positions of the barrel, means having a delivery outlet with which said bores are adapted to be brought into registry to provide an unobstructed delivery passage from the hopper to the delivery outlet, a ratchet wheel carried by said barrel having teeth spaced to correspond to the spacing of the article receiving bores, a pawl for the ratchet wheel, means for imparting indexing motion to the barrel and its ratchet wheel, and friction drive means for said motion imparting means.

2. In an article handling device adapted to effect substantially continuous feed, the combination of a hopper; a feed barrel mounted for rotation on a substantially vertical axis and having a plurality of circularly arranged evenly spaced longitudinally extending article receiving bores all of which open into the hopper in all positions of the barrel; a ratchet wheel carried by said barrel having teeth spaced to correspond to the spacing of the article receiving bores; a pawl cooperating with the ratchet wheel to prevent rotation of the barrel in one direction; drive means for rotating said barrel in its other direction including a continuously rotating driving member, a driven member carried by said barrel, means for imparting step by step rotation to said driven member from said continuously rotating driving member, and a yieldable driving connection between said driving and driven members; and a delivery tube adapted to receive articles from said barrel.

3. In an article handling device adapted to effect substantially continuous feed, the combination of a hopper; a feed barrel mounted on a substantially vertical axis and having a plurality of circularly arranged evenly spaced longitudinally extending article receiving bores all of which open into the hopper in all positions of the barrel; a ratchet wheel carried by said barrel having teeth spaced to correspond to the spacing of the article receiving bores; a pawl cooperating with the ratchet wheel to prevent rotation of the barrel in one direction; a driven member carried by the barrel; a continuously rotating driving member; a crank carried thereby; an oscillatable member; means for drivingly connecting said oscillatable member to said crank; means for establishing a driving connection between said oscillatable member and the driven member of said barrel including a friction clutch for transmitting drive to the driven member in one direction of oscillation of the oscillatable member only; and a delivery tube adapted to receive articles from said barrel.

4. An article handling device such as set forth in claim 3, said crank being adjustable.

5. In an article handling device adapted to effect substantially continuous feed, the combination of a hopper; a removable rotatable feed barrel mounted on a substantially vertical axis and having a plurality of vertically extending article receiving channels each of which opens into the hopper in all positions of the barrel; a delivery tube adapted to receive articles from said barrel; and means for moving said barrel into prescribed positions in which successive channels are brought into registry with said delivery tube including adjustable means altering the number of such positions to correspond to the number of bores in the barrel.

6. In an article handling device the combination of a hopper, means spaced therebelow having a single delivery outlet, and pick-up means between the hopper and said first mentioned means, said pick-up means having a plurality of unobstructed feed channels all of which open directly into the hopper to receive articles therefrom and any one of which is adapted to be brought into registry with said delivery outlet to directly deliver articles from the hopper to the outlet for discharge, and friction drive means for effecting such registry of the feed channels, said drive means being controlled in its action by the position of the articles in the channel which registers with the delivery outlet.

7. In a gravity feed article dispatching device, the combination of a hopper containing articles to be dispatched, a fixed dispatching device and a rotatable distributor having a plurality of vertically disposed channels all of which open into the hopper in all positions of the distributor for receiving articles from the hopper and one of which at a time is adapted to deliver articles to the dispatching device, and means operating to rotate the distributor to bring a different channel into registry with the dispatching device only when no article in the particular channel thru which feed is taking place is part way in the distributor and part way in the dispatching device, whereby articles will continue to be fed thru said particular channel as long as such condition exists.

8. In an article handling device, the combination of a hopper, a fixed dispatching tube spaced therebelow, a rotatable distributing barrel located in the space between the hopper and dispatching tube, said barrel having a plurality of feed channels, means for rotating said barrel in steps to successively bring the channels into registry with the dispatching tube including, an oscillating driving member, a driven member adapted to be rotated by said driving member and connected to the barrel to impart rotary movement thereto, means for preventing rotation of the driven member in one direction of rotation, friction means interposed between the driving and driven means adapted to slip when the driving member oscillates in its non-driving direction and also adapted to slip when said driving member is under resistance to movement of a predetermined value in its direction of driving.

9. An article distributing device adapted to effect substantially continuous feed comprising in combination, a hopper for the articles to be distributed, a movable distributor for the articles mounted on an upright axis and having a plurality of upright article receiving channels each opening into the hopper in all positions of the distributor, a receiver adapted to receive articles from said channels, and means for moving said distributor to successively bring the channels thereof into registry with the receiver for discharge thereinto whereby an unobstructed upright feed channel is provided from the hopper to the receiver.

10. In an article handling device adapted to effect substantially continuous feed, the combination of a hopper, a distributing barrel mounted on a substantially vertical axis and having a plurality of upright article receiving channels each opening into the hopper in all positions of the barrel, a dispatching tube, and means for intermittently moving said barrel into prescribed distributing positions whereby unobstructed upright feed channels are provided from the hopper to the receiver.

11. An article distributing device adapted to effect substantially continuous feed comprising in combination, a hopper for the articles to be distributed, a dispatching tube for said articles, a substantially vertically disposed distributing barrel between the hopper and tube having a plurality of substantially vertically extending article receiving channels each opening into the hopper in all positions of the barrel, and yieldable drive means for intermittently moving said barrel to successively bring said channels into registry with said tube, said barrel when so positioned providing an unobstructed substantially vertically extending feed channel from the hopper to the dispatching tube.

12. In an article handling device adapted to effect substantially continuous feed, the combination of a movable hopper, a movable barrel having a plurality of substantially vertically extending article distributing bores all of which directly open into the hopper in all positions of the barrel, a member associated with said barrel having a single delivery outlet, index means for said barrel, said barrel when indexed providing uobstructed direct communication between the hopper and delivery outlet, and means for agitating said hopper to facilitate entrance of articles into the barrel.

13. In an article handling device adapted to effect substantially continuous feed, the combination of a hopper, a substantially vertically disposed distributing barrel opening directly into the hopper, a dispatching device and means for intermittently moving said barrel into prescribed distributing positions, said means being active to move the barrel only under predetermined feed conditions in the barrel.

14. In an article handling device adapted to effect substantially continuous feed, the combination of a hopper, a fixed dispatching device, a substantially vertically disposed rotatable distributing barrel located between the hopper and dispatching tube, said barrel having a plurality of substantially vertical feed channels all of which open directly into the hopper, means for rotating said barrel in steps to successively bring the channels into registry with the dispatching device including means adapted to yield when an article is part way in a feed channel of the barrel and part way in the dispatching device, whereby feed through a particular channel continues as long as articles therein become so positioned at the time the means for rotating the barrel is moving in its direction of imparting step movement.

15. In an article handling device adapted to effect substantially continuous feed, the combination of a hopper, a substantially vertically disposed distributing barrel opening directly into the hopper, a dispatching device and oscillating means for intermittently moving said barrel into prescribed distributing positions, said oscillating means including means adapted to yield under resistance to movment of a predetermined value offered by an article being located part way in the barrel and part way in the dispatching device and thus maintain the barrel in its selected distributing position for further feed in that position.

HAROLD N. BLISS.